United States Patent [19]

Meier

[11] Patent Number: 4,512,429
[45] Date of Patent: Apr. 23, 1985

[54] WEIGHING APPARATUS FOR PRODUCING GEOGRAPHICALLY-CORRECTED MEASUREMENTS

[75] Inventor: Linus Meier, Saland, Switzerland

[73] Assignee: Mettler Instruments AG, Greifensee, Switzerland

[21] Appl. No.: 572,014

[22] Filed: Jan. 19, 1984

[30] Foreign Application Priority Data

Mar. 23, 1983 [CH] Switzerland ............... 1580/83

[51] Int. Cl.$^3$ ............ G01G 19/22; G01G 23/14; G01G 3/14
[52] U.S. Cl. .................... 177/25; 177/164; 177/210 EM; 177/210 FP
[58] Field of Search .......... 177/164, 200, 210 R, 177/210 EM, 210 C, 210 FP, 260, 25

[56] References Cited

U.S. PATENT DOCUMENTS

| | | | |
|---|---|---|---|
| 3,224,517 | 12/1965 | Cahn | 177/210 EM |
| 3,322,222 | 5/1967 | Baur | 177/210 EM |
| 3,688,854 | 9/1972 | Strobel | 177/164 |
| 3,903,976 | 9/1975 | Ziefle | 177/164 |

FOREIGN PATENT DOCUMENTS 7904055  7/1979  Fed. Rep. of Germany .

*Primary Examiner*—E. A. Goldberg
*Assistant Examiner*—Patrick W. Foster
*Attorney, Agent, or Firm*—Laubscher Philpitt & Laubscher

[57] ABSTRACT

An electromechanical weighing apparatus is disclosed including a device for correcting the load measurement in accordance with the given gravitational force existing at the geographical place of installation of the weighing apparatus. An adjusting mechanism (6) is used to set various switching states corresponding with given different predetermined gravitational acceleration values, respectively, and a calculator or microprocessor (41)—operable in accordance with the aforementioned switching positions to supply from a storage unit corresponding retrievable gravity values—determines the adjusted gravitational acceleration value that is to be used to modify the measured weight signal to produce a geographically-corrected signal of the mass of the object being weighed that is displayed on the indicating device.

5 Claims, 2 Drawing Figures

WEIGHING APPARATUS FOR PRODUCING GEOGRAPHICALLY-CORRECTED MEASUREMENTS

BRIEF DESCRIPTION OF THE PRIOR ART

This invention relates to an improved weighing apparatus including means for correcting the weight reading to compensate for variations in the forces of gravity which occur at various parts of the world in which the apparatus might be used. The invention is particularly suitable for use in connection with weighing apparatus of the vibratory string type illustrated in the prior U.S. Pat. Nos. 3,897,681 and 3,963,082 in the name of Eugen Meier, and the patent applications of Eugen Meier Ser. No. 411,994 of Aug. 27, 1982, and Ser. No. 453,103 of Dec. 27, 1982, all assigned to the same assignee as the present invention.

It is known that the constant acceleration of an object under the force of gravity varies in different parts of the world, as for example, from 980.11 cm/sec² in Washington, D.C. to 982.18 cm/sec² in Eagle City, Alaska. Consequently, it has been proposed to calibrate gravitational-force-responsive scales to compensate for variations in gravity which occur at different geographical locations, respectively. Thus, a calibrating weight is normally provided which is either constructed integrally with the weighing apparatus, or is supplied as a separate component by the manufacturer. One drawback to this known system is that scales adapted for high standard loads often require correspondingly heavy and voluminous weights, thereby resulting in high transportation costs, and corresponding excessive dimensioning of the scale.

For scales in higher weight categories (i.e., more than about 100 kg) and with comparatively little resolution (less than about 5,000 units), it is customary to specify geographical zones of use, in other words, utilization places which have been combined into zones, for which in each case one can give an average gravitational acceleration value for the particular scale and the scales in each case can be calibrated for one of these utilization zones. This calibration as a rule must be renewed by the manufacturer if a scale is to be used in a different utilization zone.

When the known scales are of the type which produce an electrical signal corresponding to the weight measurement, use is normally made of electronic means, such as a microprocessor, for processing the weighing force signals stemming from the weighing cell into the indication signal which controls the display mechanism. Thus, the possibility is provided for correcting for variations in the gravitational acceleration by the use of electronic means, thereby avoiding the drawbacks of the prior compensation or calibration means.

SUMMARY OF THE INVENTION

Accordingly, a primary object of the present invention is to provide a weighing apparatus of the type described above which can be calibrated in a simple manner by the scale user himself as desired for one of several predetermined geographical installations without the use of calibration weights. The weighing system includes an analyzing mechanism having a storage section and a calculating or arithmetic section, calibrating means being provided for modifying the operation of the analyzing mechanism in accordance with the specific geographical location of the place of installation of the scale, thereby to produce a corrected weighing value. To this end the earth is divided into a plurality of zones or regions having gravity acceleration values that vary within a given range from an average or mean value, which range is divided up into a plurality of equal increments. Thus, for a particular installation the base gravity acceleration is modified by one or more increments to produce a resultant gravity acceleration that modifies the load responsive electrical signal produced by the load cell.

According to a more specific object of the invention, an analyzing mechanism is provided including a storage section for storing the base gravity acceleration value and the increments thereof, and an adjusting or calibrating mechanism for modifying the base gravity acceleration value with a selected number of increments thereof, depending on the specific geographical site of use of the weighing apparatus. The analyzing mechanism includes also an algebraic or calculating section that divides the weighing force value corresponding with the electrical weighing signal produced by the cell by the resultant gravity acceleration value, thereby to produce a gravity-corrected value of the mass of object being weighed. Thus, the corrected mass value m is produced in accordance with the formula $$m = \frac{F}{g_0 \pm k\, \Delta g} \qquad (1)$$

where
F = measured load weight
$g_o$ = base gravity value
k = selected integer
$\Delta g$ = incremental gravity value.

In these and similar versions of the invention, the adjusting mechanism can be a sequence switch with a number of switching positions corresponding with the total number of utilization zones provided. Instead of this, the large number of switching states often required can also be represented by coded switching position combinations of comparatively few manually operated switches. Moreover, one can also provide electronic switches which, for example, are controlled by a numerical keyboard.

In accordance with another embodiment, the correction mechanism includes means for storing the particular pertinent gravitational acceleration value for all localities with major scale installation density, for example, all major cities of the world, and retrieving that value by introducing the name of the locality with the aid of an alphabetical keyboard. Apart from the required larger storage capacity, this solution offers the advantage that the accurate gravitational acceleration values of each selected installation site are used as basis for the correction. In this way—compared to the solution with the zone subdivision—it is possible increasingly to take into consideration also deviations of the gravitational acceleration which depend on the elevation of the site and the density of the earth's crust at that location.

BRIEF DESCRIPTION OF THE DRAWING

Other objects and advantages of the invention will become apparent from a study of the following specification when viewed in the light of the accompanying drawing, in which.

DETAILED DESCRIPTION

Figure 2:
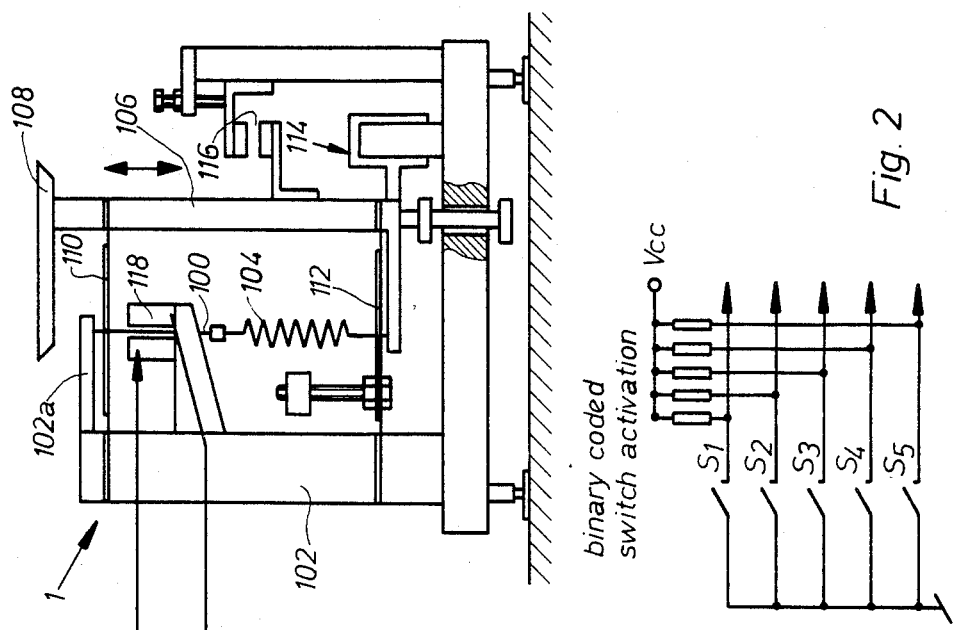
FIG. 2 is a schematic representation of the 32-position keyboard switch means of FIG. 1.

It is known in the art (as evidenced, for example, by the aforementioned Meier U.S. Pat. Nos. 3,897,681 and 3,963,082) to provide a weighing apparatus 1 having a vibratory string 100 that is driven by an oscillator 2, whereby variations in the oscillating frequency of the string are a function of the load applied to the weighing apparatus. Thus, in the conventional weighing apparatus 1, the upper end of the string 100 is connected with a horizontal portion 102a of the stationary frame 102, and the lower end of the string is connected by spring 104 with the vertically movable pan carrier 106 that carries the weighing pan 108. The pan carrier 106 is guided for vertical movement relative to the frame in parallelogram fashion by horizontal upper and lower resilient guide arms 110 and 112. Eddy current brake means 114 serve to retard and damp movement of the pan carrier relative to the frame, and opposed magnet means 116 afford calibration adjustment, as is known in the art. The string 100 is driven by oscillator 2 via the conventional exitation and sensing head 118.

Weight-responsive variations in the frequency of oscillation of the string 100 are measured by a conventional frequency meter 3 which preferably includes counter means for providing a digital counting result. This counting result is supplied to the analyzing means 4 for determining the weight force F (as taught, for example, by the Swiss Pat. No. 577,164). More particularly, the analyzing mechanism includes a calculator or microprocessor 41, and a fixed-valve storage unit 42 in which are stored the specific data which are characteristic of the weighing apparatus. Calculator 41 is operable to determine mass m in accordance with the equation:

$$m = \frac{F}{g}, \quad (2)$$

where g is a predetermined value of gravitational acceleration. The resultant mass value m is then read-out in digital form by the indicating display means 5.

In accordance with the present invention, means are provided for correcting the weight indication in accordance with the particular gravitational acceleration prevailing at the geographical installation of the scale, and includes an adjusting mechanism 6 which functions with parts of the calculator 41 and the fixed storage unit 42.

As an illustration of the operation of the weighing system, assume that the gravitational acceleration is divided into 32 utilization zones, where the average values of gravitational acceleration, which correspond with the utilization zones, form a series of values of equal increments. The resultant gravitational acceleration g for a given utilization zone may be determined by the formula:

$$g = g_o + k\Delta g \quad (3)$$

where
$g_o$ = the lower value in the gravity value series
$\Delta g$ = the value increment
$k$ = one of the 32 integral factors of from 0 to 31.

Alternatively, the higher value of the series could be used as the base value $g_o$ instead of the lower value, whereupon:

$$g = g_o - k\Delta g \quad (4).$$

Figure 1:
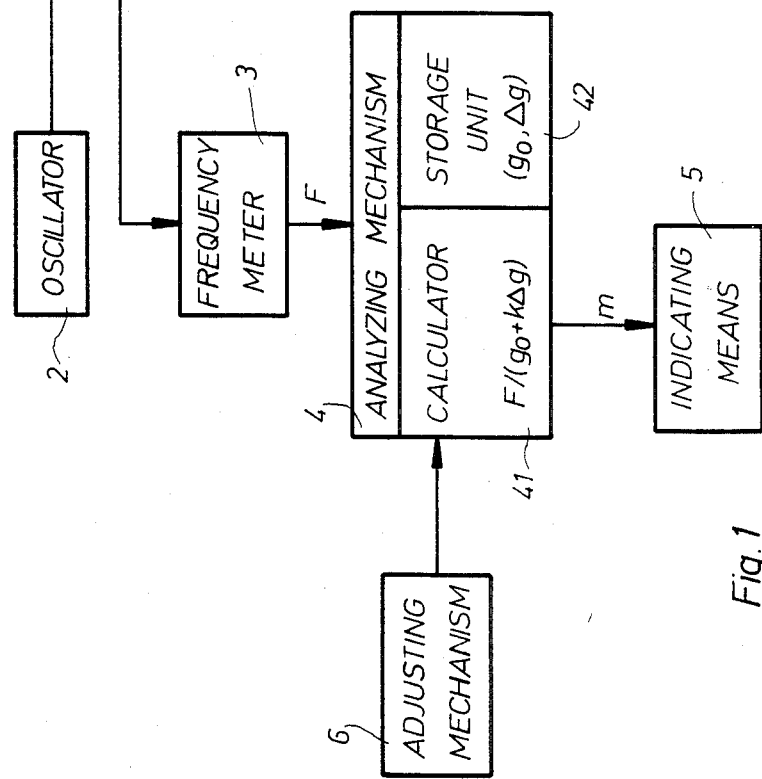
FIG. 1 is a diagrammatic illustration of the weighing system of the present invention.

As shown in FIG. 2, the 32 factors are afforded by the thirty-two different switching states of the five-switch adjusting mechanism 6 of FIG. 1. For this purpose, the five switches $S_1$-$S_5$ have terminals connected with five outputs affording 32 switch position combinations. The base value $g_o$ and the incremental value $\Delta g$ of the gravitational acceleration are placed in the fixed value storage unit 42.

OPERATION

To generate an indicated weighing signal, the stored values $g_o$ and $\Delta g$ are retrieved from the storage unit 42, and the factor k is inserted into the calculator 41. This is achieved by actuating the adjusting mechanism 6 which may comprise coded switches furnishing one of the switching state combinations indicated in FIG. 2. In other embodiments, the adjusting mechanism 6 may comprise a numerical keyboard for choosing the appropriate factor k which then serves for the calculation of the corrected weight signal. In still other embodiments, the keyboard may be an alphanumerical one, if the appropriate location is to be chosen by name, as mentioned above. In any embodiment, it is to be noted that choosing and insertion of the appropriate factor (or name, respectively) must be effected only once, when the weighing apparatus has come to a new gravitational zone (or location, respectively). Calculator 41 further receives from the frequency meter 3 the weighing signal F, whereupon calculator 41 produces for the indicating means 5 a corrected weight value which at least approximates the magnitude of the mass of the weighed article, in accordance with formula (1) above.

While in accordance with the Patent Statutes, the preferred form and embodiment of the invention has been illustrated and described, it will become apparent that various changes and modifications may be made without deviating from the inventive concepts set forth above.

What is claimed is:

1. In an electromechanical weighing apparatus including digital indicating means for displaying the weight of an object being weighed, the improvement which comprises means for correcting the displayed weight value in accordance with the specific force of gravity prevailing at the geographical location of the weighing apparatus, including
   (a) analyzing means (4) connected between said weighing apparatus and said indicating means, said analyzing means including calculating means (41) and a storage means (42);
   (b) electromechanical adjusting means (6) operable in a plurality of operating conditions corresponding with different predetermined gravitational acceleration values, respectively;
   (c) said calculating section being operable in accordance with the selected condition of said adjusting mechanism and the information contained in said storage means to modify the weight signal (F) produced by said weighing apparatus such that said indicating means displays a corrected value which generally corresponds with the magnitude of mass (m) of the object being weighed.

2. Apparatus as defined in claim 1, wherein said storage means contains a plurality of gravitational acceleration values a selected one of which is supplied to said calculator means in accordance with the selected state of said adjusting means (6), said calculator means being operable to form from the measured weight value (F) and from the supplied gravitational value (g) the quotient (F/g).

3. Apparatus as defined in claim 1, wherein said storage means contains a base gravity value ($g_o$) and a series of gravity values of equal increments ($\Delta g$), and wherein said adjusting mechanism is operable to supply a selected integral factor (k) corresponding with the geographical location of the weighing apparatus, said calculator being operable to produce the corrected mass value m in accordance with the formula:

$$m = F/(g_o \pm k\Delta g).$$

4. Apparatus as defined in claim 2, wherein said adjusting means includes a plurality of switches (S1–S5) defining a number of switching conditions, respectively.

5. Apparatus as defined in claim 2, wherein said adjusting means includes keyboard means for inputting the identification of a given installation site, whereby the corresponding gravitational value can be retrieved from the storage unit.

* * * * *